US012734081B2

(12) United States Patent
Heath et al.

(10) Patent No.: US 12,734,081 B2
(45) Date of Patent: Sep. 15, 2026

(54) AIRCRAFT STRETCHER

(71) Applicant: SKYBUDI PTY LTD, Northcote (AU)

(72) Inventors: Andrew Martin John Heath, Northcote (AU); Linda Heath, Northcote (AU); Matthew Blythman, Belgrave (AU); Matthew Charles Richardson, Melbourne (AU); Boris Eisenbart, Arakoon (AU); Benedikt Lux, Augsburg (DE)

(73) Assignee: SKYBUDI PTY. LTD., Northcote (AU)

( * ) Notice: Subject to any disclaimer, the term of this patent is extended or adjusted under 35 U.S.C. 154(b) by 46 days.

(21) Appl. No.: 18/853,005

(22) PCT Filed: Mar. 30, 2023

(86) PCT No.: PCT/AU2023/050242
§ 371 (c)(1),
(2) Date: Sep. 30, 2024

(87) PCT Pub. No.: WO2023/183979
PCT Pub. Date: Oct. 5, 2023

(65) Prior Publication Data

US 2025/0213404 A1 Jul. 3, 2025

(30) Foreign Application Priority Data

Mar. 31, 2022 (AU) ................................ 2022900828

(51) Int. Cl.
*A61G 3/08* (2006.01)
*A61G 1/017* (2006.01)
(Continued)

(52) U.S. Cl.
CPC ........... *A61G 3/0875* (2013.01); *A61G 1/017* (2013.01); *A61G 1/0293* (2013.01); *A61G 1/044* (2013.01);
(Continued)

(58) Field of Classification Search
CPC . A61G 1/00; A61G 1/017; A61G 1/06; A61G 1/044; A61G 1/013; A61G 3/00;
(Continued)

(56) References Cited

U.S. PATENT DOCUMENTS 5,259,575 A * 11/1993 Cabrera ................. B64D 11/00 244/118.6
9,205,007 B2 * 12/2015 Chinn .................... A61G 1/048
(Continued)

FOREIGN PATENT DOCUMENTS

AU 2011200503 A1 8/2011
AU 2020102223 A4 11/2020
(Continued)

OTHER PUBLICATIONS

International Search Report and Written Opinion for PCT/AU2023/050242, mailed Jun. 6, 2023.

*Primary Examiner* — Madison Matthews
(74) *Attorney, Agent, or Firm* — Dorsey & Whitney LLP

(57) ABSTRACT

A portable aircraft stretcher for supporting a person on an aircraft, the stretcher configured for location in a port-starboard orientation across three or four side-by-side commercial aircraft seats. The stretcher includes a seat and a backrest. The backrest has a reclined orientation for supporting the person in a reclined position across and above the three or four aircraft seats. The stretcher further includes a support member extending downwardly from the backrest for supporting the backrest. The stretcher further includes a harness for securing the person to the stretches and one or more connection points configured to engage with at least one aircraft seatbelt of the three or four aircraft seats for securing the stretcher to the aircraft seats.

23 Claims, 9 Drawing Sheets

(51) Int. Cl.

| | |
|---|---|
| ***A61G 1/02*** | (2006.01) |
| ***A61G 1/044*** | (2006.01) |
| ***B64D 11/00*** | (2006.01) |

(52) U.S. Cl.
CPC *A61G 2200/327* (2013.01); *B64D 2011/0092* (2013.01)

(58) Field of Classification Search
CPC ...... A61G 1/048; A61G 2220/10; A61G 1/04; A61G 7/103; A61G 7/1046; A61G 7/1019; A61G 5/006; A61G 2200/32; A61G 2200/34; A61G 7/015; A61G 7/00; A61G 7/02; A61G 5/14; A61G 7/16; A61G 7/08; A61G 3/0875; B64D 2011/0092; B64D 11/00; B64D 11/06; B64D 9/00; B64D 11/0604; B64D 11/0636; B64D 25/02; A61H 2201/0149; A61H 2201/0161; A61H 31/008; B61D 1/02; B60N 2/04; B60N 2/0735; B60N 2/0742; B60N 2/0745; B60N 2/10; B60N 2/12; B60N 2/24; B60N 2/3015; B60N 2/34; B60N 2/4242; B60N 2/4279; B60N 2/43; B60N 2/643; B60N 2/646; B60N 2/68; B60N 2/688; B60N 2/803; B60N 2/885; B60N 2/986; B60N 2/995; B60N 2002/247; B60N 2/42736; A47C 17/80; A47D 15/005; A47D 15/006; A47D 15/008
USPC .................... 244/118.5, 118.6, 118.2, 129.3; 224/137.2; 105/316, 319; 297/188.01; 5/118; 296/19
See application file for complete search history.

(56) References Cited

U.S. PATENT DOCUMENTS

| | | | | |
|---|---|---|---|---|
| 2002/0171009 | A1* | 11/2002 | Alli | B64D 9/00 244/118.5 |
| 2003/0057323 | A1* | 3/2003 | Keogh | B64D 11/0604 244/118.5 |
| 2004/0034935 | A1* | 2/2004 | Ferneau | A61G 1/0237 5/618 |
| 2011/0260482 | A1* | 10/2011 | Bourgraf | B60N 2/04 296/19 |
| 2013/0328361 | A1* | 12/2013 | Egan | B64D 11/06 297/188.01 |

FOREIGN PATENT DOCUMENTS

| | | | | |
|---|---|---|---|---|
| DE | 2318964 | A1 | 10/1974 | |
| EP | 885604 | A2 | 12/1998 | |
| EP | 3760177 | A1 * | 1/2021 | A61G 1/04 |
| FR | 2798842 | A1 * | 3/2001 | A61G 3/00 |
| WO | WO-2012064942 | A2 * | 5/2012 | A61G 1/048 |
| WO | WO-2020157456 | A1 * | 8/2020 | A61G 7/103 |

* cited by examiner

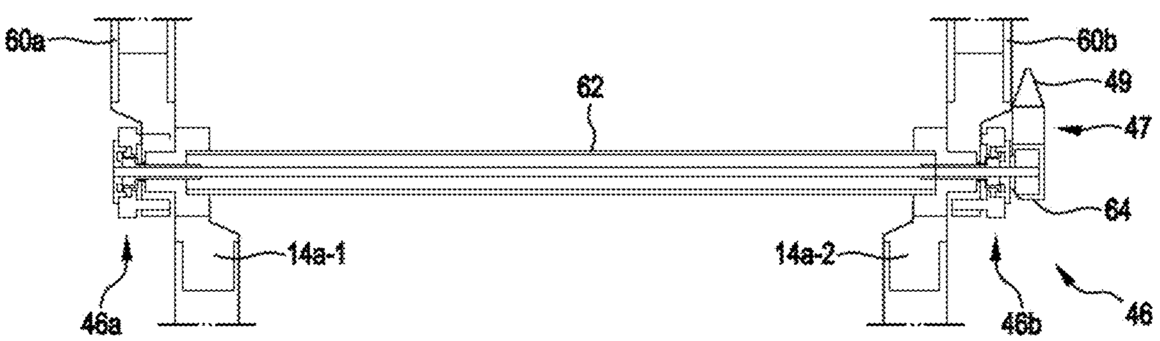
Figure 4
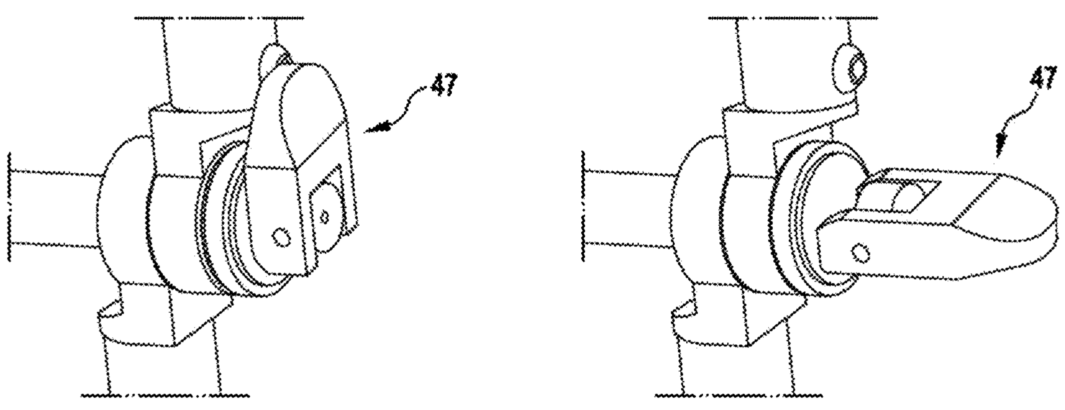
Figure 5
Figure 6

AIRCRAFT STRETCHER

PRIORITY CROSS-REFERENCE

This application is a national stage entry under 35 U.S.C. § 371 of International Application No. PCT/AU2023/050242, filed 30 Mar. 2023 and entitled "AIRCRAFT STRETCHER," which claims priority to Australian provisional patent application no. 2022900828, filed 31 Mar. 2022, the entire contents of each of which are hereby incorporated by reference.

TECHNICAL FIELD

The present invention relates to an aircraft stretcher for supporting a person on an aircraft. The invention may have application as a medical stretcher for transporting persons having limited mobility on an aircraft. The invention may also have application as a sleeping stretcher for sleeping passengers or crew of an aircraft. The invention has particular application for use on board aircraft but it will be appreciated that the invention may be suitable as a stretcher for persons in other forms of transportation such as automobiles, buses, trains, ships and the like.

BACKGROUND OF INVENTION

The following discussion of the background to the invention is intended to facilitate an understanding of the invention. However, it should be appreciated that the discussion is not an acknowledgement or admission that any aspect of the discussion was part of the common general knowledge as at the priority date of the application.

For various reasons it is desirable to enable passengers or crew of an aircraft to be supported in a comfortable reclined position.

One such example is to improve sleeping conditions for passengers or crew of a long-duration flight. Economy class airline seats allow only a limited angle of recline which creates uncomfortable sleeping conditions for some passengers. Premium economy and business class seats enable greater recline but can be prohibitively expensive for some passengers and are often less available as compared to the larger amount of economy class seats.

Another example is air transportation of persons having limited mobility due to injury, infirmity or other medical condition. For example, a medical patient may require air transport for repatriation after an injury occurring overseas or for long-distance transport to a hospital for treatment.

Various challenges are associated with air transporting persons having limited mobility. In addition to difficulties transporting a patient through an airport and onto an aircraft, patients of limited mobility may be unable to sit upright in an aircraft seat and/or may be required for medical reasons to lay in a reclined position which cannot be accommodated by an economy class aircraft seat of a commercial aircraft.

Specialised medical air transport services such as the air ambulance service allow for patients to be transported on a flat stretcher however the cost of these services is often prohibitive for the patient or their health insurer. Another method is to transport a patient in a business class seat of a commercial aircraft which allows for a more reclined position as compared to an economy class seat. However, this requires a patient to be sitting upright for take-off and landing which can be medically undesirable or in some cases clinically impossible. Furthermore, the cost of a business class seat can also be prohibitive and particularly where an adjacent business class seat is required for a medical escort and/or for medical equipment.

Another method involves a conventional stretcher being transported in economy class of a commercial aircraft but requires for 6 to 9 seats to be removed or modified in order to accommodate the stretcher. Furthermore, the relatively large height of a conventional stretcher locates the patient's head undesirably close to the aircraft bulkhead. During severe turbulence it is possible for a patient's head to lift off the stretcher and contact the bulkhead. The close proximity to the bulkhead also requires the patient to lay flat for the whole flight duration which can be uncomfortable and/or medically undesirable in some cases.

A further existing method involves a stretcher being secured in a fore-aft orientation atop 3 to 6 seats. For example, Japanese patent document JP2002325802 discloses a patient stretcher located atop three economy class seats. This method suffers from the drawback of requiring seat backrests to be reconfigured by engineers to a horizontal orientation. Furthermore, the patient must be transported adjacent to the window to allow passengers in adjacent seats access to the aisle. Consequentially, access to the patient is either restricted or it becomes necessary to book additional seats adjacent the patient and thereby significantly increasing cost.

Moreover, some current solutions require a 185 cm stretcher to be manually carried on board through the aircraft bulkhead, gallery, toilets and down the aisle. On small narrow body aircraft this requires modification of aircraft toilets walls to accommodate the radius turns.

SUMMARY OF INVENTION

In view of these problems, it is desirable to provide an improved or alternative solution for supporting aircraft passengers in a reclined position which is less costly and/or more convenient and/or which provides an alternative choice for air travellers, medical patients or carers for medical patients.

According to an aspect of the invention, there is provided a portable aircraft stretcher for supporting a person on an aircraft, the stretcher configured for location in a port-starboard orientation across three or four side-by-side commercial aircraft seats and the stretcher including: a seat and a backrest, the backrest having a reclined orientation for supporting the person in a reclined position across and above the three or four aircraft seats; a support member extending downwardly from the backrest for supporting the backrest; one or more connection points configured to engage with at least one aircraft seatbelt of the three or four aircraft seats for securing the stretcher to the aircraft seats; and a harness for securing the person to the stretcher.

According to another aspect, there is provided a portable aircraft stretcher for supporting a person on an aircraft, the stretcher configured for location in a port-starboard orientation across three or four side-by-side commercial aircraft seats and the stretcher including: a seat and a backrest, the backrest having a reclined orientation for supporting the person in a reclined position across and above the three or four aircraft seats; a support member extending downwardly from the backrest for supporting the backrest, a harness for securing the person to the stretcher and wherein the stretcher is configured to engage with at least one aircraft seatbelt of the three or four aircraft seats for securing the stretcher to the aircraft seats. The stretcher may be configured to engage with the at least one aircraft seat in that it is connectable to the aircraft seat via one of the aircraft seatbelts. For example, the stretcher may include a connection point such as an opening configured to receive (and thereby engage with) one of the aircraft seatbelts.

The invention advantageously provides a stretcher configured to be located across commercial aircraft seats without requiring seat removal or adjustment. In contrast to some existing aircraft stretcher systems, the invention is configured as a non-displacement solution aircraft seating is not displaced by the presence of the stretcher and thereby avoiding the time, cost and inconvenience associated with removing and replacing aircraft seats. The stretcher of the present invention is configured for use with economy class seating thereby reducing airfare costs.

It is envisaged that the stretcher of the present invention may have a commercial passenger application as a sleeping-stretcher or aircraft bed. Furthermore, the stretcher of the invention may be used to transport persons having limited mobility.

The stretcher of the present invention is advantageously capable of continuously supporting the person in-flight (for example a sleeping passenger or crewmember on a long-duration flight). The stretcher of the present invention may also be suitable for supporting a person (for example a passenger having limited mobility) during loading and unloading of that person from the aircraft. For example, a person of limited mobility may be located onboard the stretcher at a hospital or upon exiting a medical transport vehicle at an airport, the stretchered person might remain onboard the stretcher during transport to the airport, through the airport terminal, during loading onto the aircraft, during take off and in-flight and landing and then during unloading from the aircraft at the destination. The invention advantageously reduces the amount of movement that an injured or immobilised person is required to undergo during aircraft transport.

The stretcher of the present invention is advantageously configured for positioning in port-starboard orientation i.e. 90° to aircraft direction of travel. The invention therefore does not require removal or modification of the aircraft seat backrests as required by the system disclosed in JP2002325802. The seating row behind the stretcher is unaffected by the presence of the stretcher and can be used as ordinary seating for fare-paying passengers.

Previous systems such as that disclosed in JP2002325802 typically require an aircraft engineer to modify existing seats which involves isolating the seat power supply and removing or collapsing 6 to 9 seats by adjusting the internal seat mechanism to allow the backrests to be flattened. An engineer is then typically required to install a structural frame over two rows of seats for the stretcher to attach. The present invention advantageously does not require an aircraft engineer for installation because the invention is configured for installation without seat removal or seat modification and without isolation of the seat power supply.

The stretcher of the present invention is configured for connection to the aircraft seats using the aircraft seat belts and/or an aircraft extension seat belt. This drastically improves installation time as compared to previous systems and potentially avoids aircraft delays due to seat reconfiguration. This is in contrast to some previous stretchers which include a berth or base connected to the cabin floor and therefore required specialised installation procedures and/or seat removal.

The stretcher of the present invention can advantageously transport the person in a reclined position which is typically more comfortable than lying flat or sitting upright. In the case of a medical application where the stretcher is used to transport a person of limited mobility or in poor health, the reclined orientation of the stretcher is in some cases medically preferably as compared to a patient lying flat or sitting upright.

In a form of the invention, the stretcher may be configured to support a person in the zero-gravity position. The zero-gravity position whereby the heart is approximately equal or slightly below the knee creates a neutral position whereby the heart becomes more efficient by optimising the perfusion and ventilation match. The increase in preload and decrease afterload on the heart results in an increased stroke volume and cardiac output with reduction in the heart rate and decrease in blood pressure. The chest elevation allows for basal expansion of the lungs increasing the volume of oxygen exchanged. These two factors increase supply of oxygen and reduced oxygen consumption by the body, a critical function in the oxygen deprived environment of aviation. This may have a secondary effect of reducing fatigue or jet lag.

According to an embodiment of the invention, the stretcher has a one-piece or unitary configuration. For example, the stretcher may include a moulded shell sized and shaped to fit across 3 or 4 adjacent aircraft seats and to receive and support a person atop the stretcher.

According to an alternative embodiment, the stretcher has an articulated or multi-part configuration which advantageously allows the stretcher to be adjusted in use and/or folded away for storage. For example, the stretcher may include a backrest hinge connecting the backrest to the seat and allowing selective adjustment of the backrest position relative to the seat and adjustment of the backrest's reclined orientation. This advantageously enables the angle of recline to be adjusted according to personal preference or to better suit a person's height.

According to an embodiment of the invention, the angle of backrest recline may be adjusted between 30°, 45°, 60°, 75°, 90° relative to horizontal. In contrast, some previous stretchers configured to be mounted on the top of seat backrests are only are configured to adjust between flat and 30° in order to prevent contact between the stretchered person and the overhead storage bin. The lower location of the present invention advantageously allows for a greater range of adjustment and a more upright seating position for the stretchered person.

According to an embodiment of the invention, the stretcher includes a lower-leg rest connected to the seat by a lower-leg rest hinge allowing selective adjustment of the lower-leg rest position relative to the seat. The lower-leg rest hinge allows the lower-leg rest to be positioned at a preferred angle for optimal comfort. The lower-leg rest hinge may also act as a knee break which resists sliding of the person down the stretcher. The knee break creates space between the aircraft seat and the stretcher. This space allows the person to rotate laterally from their back to their side by placing one leg on top of the stretcher with a slight bend in the knee and one leg below the stretcher but above the aircraft seat, again with a slight bend in the knee. This position accommodates a large group of the population who prefer to sleep on their side than their back. The added benefit of the knee break prevents sliding down the stretcher when lateral. Additional soft furnishing, including cushions, duvet and blankets enhance this lateral positions. This lateral position is unable to be accommodated on a narrow stretcher.

The support member may be configured to extend downwardly from the backrest and to contact a surface below the backrest so as to prevent the backrest from tipping backward. According to a form of the invention, the support member may be adjustable relative to the backrest. For example, the stretcher may include a support member hinge connecting the support member to a rear of the backrest and allowing selective positioning of the support member between a folded position and a deployed position. The support member hinge may allow for the angle between the support member and the backrest to be adjusted between a range of 0° (where the support member is essentially parallel to the backrest) and 90° (where the support member is orientated perpendicularly to the backrest). The folded position may correspond to the 0° orientation and the deployed configuration may correspond to any angle between approximately 20°-90° in which the support member is deployed to as to support the backrest.

To facilitate operation of stretcher folding and unfolding and/or in-flight adjustment, one or more of the support member hinge, backrest hinge and lower-leg rest hinge may be configured for one-handed operation. In a form of the invention, the support member hinge, backrest hinge and lower-leg rest hinge are all configured for one-handed operation. The one-handed operation may be provided by a hinge configuration having a locking handle which allows a user to manually lock and unlock the respective hinge with one hand. In the unlocked position the hinge is permitted to rotate and in the locked position the hinge is locked against rotation. One or more of the support member hinge, backrest hinge and lower-leg rest hinge may be serrated hinges. For example, the hinges may be serrated Variloc™ hinges.

In a form of the invention, each of the hinge locking handles are positioned on the same side of the stretcher. For example, each of the locking handles may be on the right-hand side of the stretcher so that, in use, the left-hand side of the stretcher faces the backrests of the adjacent aircraft seats and the locking handles face the front of the aircraft cabin for convenient access to the locking handles.

It will be appreciated that references herein to 'left-hand side', 'right-hand side' or simply 'left side' and 'right side' will be understood with reference to a left side of the stretcher and a right side of the stretcher as viewed by a stretchered person laying on the stretcher. That is, a reference a 'left side' of the stretcher will be understood as the side of the stretcher adjacent to the left side of the stretchered person.

In a form of the invention, repositioning of a medical patient having limited mobility on the stretcher may be achieved by adjustment of the back rest and lower leg knee break positions. For example, lowering of the backrest and raising of the knee break with pivoting of the stretcher may allow gravity to facilitate repositioning of the patient (for example in view of pressure area care) without the need for excess manual handling of the patient.

In an embodiment of the invention, the stretcher is collapsible to a stowed configuration allowing for stowing in the overhead storage of a commercial aircraft. For example, the support member may be moved to the folded position and the backrest and lower-leg rest folded against the seat so as to minimise the overall size of the stretcher and allowing receipt in the overhead storage bin or overhead storage shelf.

The stretcher may further include a headrest for supporting the head of the stretchered person. The headrest may include a pair of lateral supports for supporting opposite sides of the person's head. The headrest may be positionally adjustable relative to the backrest. For example, the headrest may be connected to the backrest via one or more telescopic members allowing for positional adjustment of the headrest relative to the backrest.

Typically, three side-by-side economy class commercial aircraft seats are approximately 1500 mm in width (i.e. in a port-starboard dimension) and therefore the stretcher may be configured with a total length of approximately 1500 mm or less so as to be loaded across the three side-by-side seats.

In an embodiment of the invention, the stretcher includes a frame, the backrest includes a back panel secured to the frame and the seat includes a seat panel secured to the frame. The lower-leg rest may include a foot panel or lower-leg panel secured to the frame. The frame may include an aluminium material. For example, the frame may include an aluminium material such as aluminium alloy 6060. The frame may include aluminium tubing and, in particular, 25 mm diameter aluminium tubing having a wall thickness of approximately 3 mm.

According to an embodiment of the invention, the back panel includes an aluminium panel of <2 mm thickness and, in particular, approximately 1.6 mm thickness. The back panel and lower-leg rest may include weight-reducing openings. The back panel may include a curved or concave or contoured configuration for receiving the stretchered person's back. The seat may include an aluminium seat panel which includes a concave portion. In use, the seat may be fitted with a foam cushion for improving comfort.

In an alternative form of the invention, one or more of the stretcher frame, back panel, seat panel or foot panel may include a composite material such as a carbon fibre material, Kevlar material, fibreglass material, canvas material, polymer material or fabric material such as fabric and reinforced carbon fibre. The material selected may be selected on the basis it has a fire rating or may be configured with a fire rating. One or more of the stretcher components may include additive manufactured materials such as 3D printed alloys or 3D printed hardened polymers.

In a form of the invention, the stretcher may include one or more foam layers for improved comfort. The foam may be a light-weight foam which is fire and smoke rated and suitable for aviation use.

In a form of the invention, the stretcher may have a weight of less than 10 kg and in particular of approximately 8 kg. The stretcher may therefore be permitted for overhead storage on a commercial aircraft.

In a form of the invention, the stretcher is configured for use with a small winch or pully to assist in the loading and unloading of heavy persons.

As noted above, the stretcher may be configured for transporting a person of limited mobility and may therefore be configured for continuously supporting the person of limited mobility in flight and also during take-off and landing and during loading and unloading of the person from the aircraft.

The stretcher may be configured to be transported along an aisle of a commercial aircraft whilst supporting the person of limited mobility and for the stretcher and person to be rotated approximately 90° into a port-starboard orientation during loading of the stretcher from the aisle onto the aircraft seats. The stretcher may therefore be configured in its width and/or shape or other parameter so as to better enable this function. For example, the stretcher may be configured to minimise snag or contact points with the aircraft seats during the 90° rotation of the stretcher. The stretcher backrest or frame or seat may include a rebate or recess or may otherwise be configured to minimise or avoid snagging on part of the aircraft seat during loading of the stretcher from the aisle to the seating.

The plurality of openings in the stretcher for receiving aircraft seat belts may be openings in the frame and/or backrest, seat or lower-leg rest panels. In a form of the invention one opening is provided between opposite left and right frame members and between one of the panels and one of the hinges. In a form of the invention, a lower opening is located between the seat and the lower-leg rest and a second opening is provided between the seat and the backrest. Both of the first and second openings may be bounded by left and right frame members of the frame. For example, a left tubular frame portion and a right tubular frame portion. The openings may enable the conventional aircraft seat belts to be fed through the openings in order to secure the stretcher relative to the aircraft seats.

In a form of the invention, one or more seatbelt extensions may be used such as those used for larger passengers or parents travelling with children. The seatbelt extensions may be fitted around a portion of the stretcher and/or through on one of the stretcher openings. The seatbelt extensions may be engaged with the conventional seatbelts. For example, the seatbelt extension may include a loop through which one of the conventional seatbelts are fed.

In a form of the invention, the seatbelt extensions may engage with the stretcher harness. For example, the stretcher harness may include a loop configured to receive a seatbelt extension therethrough. The seatbelt extension may extend through the loop on the harness and be connected with the aircraft seatbelts to thereby connect the aircraft seatbelts with the stretcher harness.

The one or more connection points of the stretcher may be provided in a variety of configurations suitable for connecting the stretcher to aircraft seats. For example, the one or more connection points might include one or more of a projection, loop, opening, bracket, recess or other connection element or formation for engaging with one or more of the aircraft seatbelts. In a form of the invention, the seat belts of multiple seats may engage with one connection point on the stretcher. In another form of the invention, multiple connection points are provided for engagement with multiple seat belts. The one or more connection points may be provided by any point or section or opening part of the stretcher which allows for engagement with an aircraft seatbelt. One or more of the connection points can be provided by the harness. One or more of the connection points can be provided by the seat. One or more of the connection points can be provided by the backrest. One or more of the connection points can be provided by the support member. A connection point may be provided as a male or female buckle configured for engagement with a corresponding female or male buckle of an aircraft seatbelt. A connection point may be provided by an opening in the stretcher, for example an opening in a frame portion of the stretcher or of the support member or an opening provided by the harness or between the harness and another part of the stretcher such as the seat or backrest.

A connection point may be provided at or on or as part of the harness. For example, a connection point could be provided by a loop of material connected to the harness such as a soft loop of harness material connected or integrated with the harness. In this manner, the harness may directly connect with the aircraft seatbelts. In another embodiment, the harness may not necessarily include a dedicated seatbelt connection loop and an aircraft seatbelt could instead be fed through a loop formed between a strap of the harness and part of another part of the stretcher such as the seat or backrest. This arrangement thereby also allows for direct connection between the harness and one or more of the aircraft seatbelts.

The stretcher may be configured to allow differing seat belt attachment configurations for different seating situations. For example, the one or more connection points may allow for one, two, three or four different seat belts to connect to the stretcher depending on the application. In a seating situation where the stretcher is located across three seats, the one or more connection points may allow for the three seatbelts of the three seats to engage with the stretcher. In a seating situation where the stretcher is located across four seats, the one or more connection points may allow for the four seatbelts of the four seats to engage with the stretcher.

The number of seatbelts required to secure the stretcher to the aircraft seats and the particular seatbelt path required to do so may vary depending on application and potentially depending on airline and/or Regulator requirements. For example, seatbelt attachment requirements may vary depending whether the stretcher is used during take-off and landing as may be the case when used in a medical application to transport a person having limited mobility. In contrast, where the stretcher of the invention is used as a portable bed during long-duration flights it is envisaged that the stretcher may be brought out from storage after take-off during steady flight and packaged away again before landing. In this application, the seatbelt attachment requirements may vary from those applicable for use during take-off and landing.

Similarly, harness requirements may vary depending on the particular application. It is envisaged that a harness will be required where the stretcher is used during take-off and landing such as when used to transport a person of limited mobility. However it is possible that the harness may not be required for use where the stretcher is used as a portable bed for passengers when the seat belt sign is switched off in the cabin.

In a form of the invention, the one or more connection points includes a flexible loop having an opening configured for a seatbelt to be fed therethrough. The flexible loop may be located at an underside of the stretcher seat. Alternatively, the flexible loop may be located at a side edge of the stretcher seat. In a further alternative, the stretcher may include multiple loops. For example, one at an underside of the stretcher and one or more additional loops at one or both side edges of the seat. The flexible loop may be a fabric loop of seatbelt material or seatbelt-like material. The flexible loop be formed of similar or equivalent material to the harness. The flexible loop may be formed of seatbelt material, for example, a woven webbing material.

The one or more connection points may include an opening in the support member and wherein one or more of the aircraft seatbelts is insertable through said opening in the support member. The one or more connection points may include an opening in the lower-leg rest and wherein one of the seat belts is insertable through said lower-leg rest opening.

In a form of the invention, the stretcher includes at least three connection points configured for engaging with the seatbelts of three of the aircraft seats. In a form of the invention, the stretcher includes including a first connection point configured for attachment to a seatbelt of a first aircraft seat, a second connection point configured for attachment to a seatbelt of a second aircraft seat adjacent the first aircraft seat and a third connection point configured for attachment to a seatbelt of a third aircraft seat adjacent to the second aircraft seat. In a form of the invention, the first connection point includes an opening in the support member, the second connection point including an opening in a harness loop located at the stretcher seat and the third connection point including an opening in the lower-leg rest.

In a form of the invention, the stretcher includes a first connection point including an opening in the support member configured for attachment to a seatbelt of an aircraft seat adjacent a window, a second connection point including a flexible loop located at the stretcher seat and which is configured for attachment to a seatbelt of a middle aircraft seat and a third connection point including an opening in the lower-leg rest configured for attachment to a seatbelt of an aircraft seat adjacent an aisle.

The stretcher includes a harness for securing the person to the stretcher. In an embodiment the harness includes a 4 or 5 point harness. The harness may be a 4 or 5 point harness for the stretchered person's upper torso. The harness may be configured to connect to aircraft seat belts via a seat belt extension. For example, the harness may include loops connection points such as loops which engage with the seat belt extension and/or directly with the aircraft seatbelts. The harness may include a thigh belt portion such as thigh straps and/or a lower-leg belt portion such as lower-leg straps. The harness may also include a shoulder portion such as shoulder straps and a waist portion such as waist straps.

In an embodiment of the invention the harness including a thigh portion configured to overlie and secure the person's thighs relative to the stretcher and a lower-leg portion configured to overlie and secure the person's lower-legs relative to the stretcher. The thigh portion may include a pair of thigh straps connected at a thigh buckle and the lower-leg portion may include a pair of lower-leg straps connected at a lower-leg buckle.

In an embodiment of the invention, the harness includes a shoulder portion and a waist portion, each configured to overlie and secure the person's torso relative to the stretcher. The shoulder portion may include a pair of shoulder straps and the waist portion may include a pair of waist straps and wherein the pair of shoulder straps and the paid of waist straps are each connected at a waist buckle.

The lower-leg portion and thigh portion of the harness may advantageously act to resist or prevent the person's legs from flailing during aircraft deceleration and particularly during high deceleration such as during a heavy landing.

The stretcher of the invention may, in use, be secured to 3 adjacent (i.e. side-by-side) aircraft seats. For example, seats A, B and C on the port side of an aircraft and in which seat A is a window seat, seat B is a middle seat and seat C is an aisle seat. The stretcher may be located across seats A, B and C with the stretchered person facing the aisle. The stretcher may be located such that the lower-leg rest is located over seat C, the stretcher seat is located over seat B and the backrest extends over seat A. The support member extends from the backrest and in particular may extend downwardly from the backrest. The support member may include a foot portion which overlies or contacts seat A. The backrest may be supported against seat A by the support member.

In a form of the invention, the lower-leg rest connects to seat C via the seat C seatbelt. For example, the seat C (aisle seat) seatbelt may be fed through an opening in the lower leg rest and connected and tightened to secure the lower-leg rest to seat C.

The stretcher seat may connect to seat B (middle seat) via the seat B seatbelt. For example, the seat B seatbelt may be fed through an opening in a harness loop located at the stretcher seat (for example, the underside of the seat) and connected and tightened to secure the stretcher seat to seat B.

The backrest and/or support member may connect to seat A (window seat) via the seat A seatbelt. For example, the seat A seatbelt may be fed through an opening in the support member and connected and tightened to secure the support member to seat A.

In the above examples, the seatbelts are connected to themselves (i.e. the associated male and female buckles of each seatbelt are connected together) as would be done when securing a passenger to the seat in a conventional application of the seat belt. In alternative cases, the seatbelts of one aircraft seat may be engaged with the seatbelts of another aircraft seat. For example, the female buckle of a window seat might be engaged with the male buckle of the middle or aisle seat.

In one form of the invention, the stretcher harness is self-contained with the stretcher such that the harness is independent of the aircraft seat belts. For example, the stretcher may include a 3 or 5 point harness which is attached to portions of the stretcher such as the stretcher seat and backrest. In this instance, the person on the stretcher may be secured to the stretcher via the harness and the stretcher secured to the aircraft seats via the aircraft seat belts but there is no direct connection between the person and the aircraft seat belts.

In another form of the invention, the harness may interface with part of the aircraft seatbelt system such that the person on the stretcher is secured directly to the aircraft seats. For example, the harness may include a connection point such as a bracket, opening, linkage or connection loop for engaging directly with the aircraft seatbelts or for engaging with an extension seatbelt that is engaged with the aircraft seatbelts. In some embodiments, the harness may provide a connection point via an opening formed between a strap of the harness and a part of the stretcher such as the backrest or the seat.

In another example, the stretcher harness interfaces with the seat B seatbelt via a seatbelt extension such that the stretchered person is connected to seat B via the harness which connects to the seatbelt extension which connects to the seat B seatbelt. The use of extension seat belts on aircraft is common for large passengers or for parents holding small children. The use of an extension seat belt to secure the stretcher harness therefore does not require an aircraft engineer which provides a significant advantage over existing aircraft stretcher systems.

In a form of the invention, the locking handles are configured to minimise snagging during location of the stretcher onto the aircraft seats. For example, one or both ends of hinges may have a non-protruding configuration to minimise snag points. For example, one end of the backrest hinge may have a smooth or flat or recessed configuration so as to minimise the possibility of catching or snagging on part of the aircraft seat during the 90° rotation of the stretcher.

The stretcher may include a fulcrum portion allowing the stretcher to be pivoted about the fulcrum portion for facilitating loading and unloading of the stretcher. The fulcrum portion may enable the stretcher to be pivoted backwards to a tipped position where the centre of gravity of the stretchered person is approximately over the fulcrum portion. In this tipped position the stretcher may have a 'see-saw' configuration where the stretchered person's feet are elevated and the stretcher is balanced on the fulcrum portion. In the tipped position, the stretcher may more readily be slid along the aircraft seats on the slide board to a desired position. According to a form of the invention, the fulcrum portion includes a curved portion on an underside of the seat.

The aircraft stretcher may be configured for engagement with a wheeled support device for transporting the stretcher along an aircraft aisle. For example, the stretcher may be configured for releasable connection with a wheelchair-type support device configured for wheeling the stretchered person onboard the stretcher along the aircraft aisle during loading or unloading of the stretchered person from the aircraft.

The stretcher described above may be used in combination with a low-friction slide board. For example, another aspect of the invention provides a stretcher apparatus which includes the above-described aircraft stretcher and a low-friction slide board for location between the aircraft seats and the stretcher, the slide board configured to facilitate loading and unloading of the stretcher and to also support the stretcher during flight. The slide board may enable the stretcher to be slide in and out of the aircraft seats more easily. The slide board may also provide a rigid surface on which the stretcher can be better supported as compared to locating the stretcher directly on the aircraft seats which are typically concave and/or sloped and are non-rigid. The slide board also protect the aircraft seats from damage.

The stretcher weight and load distribution during turbulence or dynamic events such as a heavy landing may be better supported by the slide board as compared to locating the stretcher directly onto the aircraft seats. The slide board may also increase the usable seat space by overhanging the front edge of the seat foam where it typically becomes soft and less usable.

The slide board may include one or more of a high-density polymer material, a fibreglass material, a metal material or a semi flexible thermoplastic material such as Patslide™ material. In a form of the invention the slide board includes a HDPE material. The slide board may be a HDPE panel having a thickness of approximately 3 mm. The slide board may be rectangular and may have a length and width which approximately corresponds with two adjacent economy class seats. In a form of the invention, the slide board may be approximately 900 mm in length and approximately 400 mm in width which approximately corresponds with two adjacent economy class seats.

The stretcher may include one or more low-friction slide pads configured to slide on the slide board during loading and unloading of the stretcher. The one or more low-friction slide pads may include a HDPE material located on an underside of the seat.

In an embodiment of the invention, the slide board includes one or more one or more grooves or tracks configured to engage with a corresponding portion of the stretcher during sliding engagement between the stretcher and slide board. For example, the one or more grooves or tracks may be configured to receive or engage one or more slide pads on the stretcher.

Another aspect of the invention provides a method for using the above-discussed stretcher apparatus. According to this aspect of the invention there is provided a method of loading a person having limited mobility onboard a commercial aircraft using the above-noted stretcher apparatus, the method including the steps of:

loading the person of limited mobility on the aircraft stretcher, transporting the stretcher, with the person supported therein, onboard the aircraft and along an aircraft aisle to a designated row of three or four side-by-side aircraft seats which include an aisle-adjacent seat;

locating the slide board across two of the three or four aircraft seats;

transferring the stretcher, with the person supported thereon, from the aircraft aisle to the aisle-adjacent seat, the step of transitioning including rotating the stretcher approximately 90° into a port-starboard orientation whilst simultaneously shifting the stretcher onto a portion of the slide board overlying the aisle-adjacent seat;

sliding the stretcher, with the person supported thereon, along the slide board in a direction away from the aircraft aisle to a position where the person and the stretcher are clear of the aisle; and securing the stretcher to the aircraft seats using the aircraft seat belts.

In a variation of the above method, the invention may involve transferring the stretcher, with the person supported thereon, from the aisle to the aisle-adjacent seat but without simultaneously rotating the stretcher and the person 90°. Instead, the stretcher and the stretchered person may be transferred from the aisle without any rotation such that the stretchered person is sitting approximately upright in the aisle-adjacent seat. The stretcher and the stretchered person may then be rotated 90° such that the stretchered person's feet are turned toward the aisle and the step of sliding the stretcher and the stretchered person away from the aisle is then performed.

This aspect of the invention provides a novel method for loading a limited mobility person onto an aircraft. The loading method is performed while the person is on the stretcher and therefore can minimise or avoid movement required of the person during the loading procedure.

The above method may include the additional step of initially securing the person to the stretcher using a harness of the stretcher, prior to loading the person onto the aircraft.

In an embodiment of this aspect of the invention, the stretcher is transported onboard the aircraft and along the aisle using a wheeled support device. The wheeled support device may include an aisle wheelchair or similar narrow wheeled device which is adapted for supporting the stretcher and transporting the stretcher and the stretchered person onboard the aircraft and along the aircraft aisle. The wheeled support device may be releasably connected to the stretcher.

In a form of the invention, the wheeled support device may be used to transport the stretcher and the stretchered person from a hospital to an airport and including transport on a wheelchair accessible vehicle, van, bus, train, boat or car etc.

In a form of the above method, the step of sliding the stretchered person across the slide board include the steps of:

pivoting the stretcher about a fulcrum portion of the stretcher such from a normal position to a tipped position wherein only the fulcrum portion is in contact with the slide board;

sliding the fulcrum portion along the slide board to a desired position with the stretcher in the tipped position; and returning the stretcher from the tipped position to the normal position.

In a form of the invention, the fulcrum portion may include the above-noted slide pads which may be engaged with the above-noted tracks or grooves in the slide board.

According to an embodiment of the invention, the stretcher is transferred from the aisle to the aisle-adjacent seat with the stretcher backrest in a relatively upright position and wherein the stretcher is reclined to a reclined position once positioned across the 3 or 4 seats. For example, the stretcher may be transported down the aisle with the stretchered person in a relatively upright seated position and the stretcher may be transitioned to the aisle-adjacent seat with the stretcher and stretchered person in this same seating position. This may facilitate the 90° stretcher rotation insofar as the horizontal length of the stretcher is minimised so as to reduce or avoid contact with adjacent seats or seatbacks or armrests. Once the stretcher is located in the port-starboard orientation on the 3 or 4 aircraft seats, the stretcher backrest can be moved to the reclined orientation in which the stretchered person is supported in a reclined position.

Unloading the person may be similarly performed by sliding the stretchered person onto the aisle-adjacent seat and rotating the stretcher 90° whilst transiting the stretcher back into the aircraft aisle and then transporting the stretchered person to an exit of the aircraft.

To help facilitate an understanding of the invention, a non-limiting example of a typical onboarding is described below.

Step 1—with the stretchered person on the stretcher and the stretcher connected to the wheeled support device, the stretcher is wheeled through the airport gate onboard the aircraft and along the aircraft aisle to a designated 3 side-by-side aircraft seats. The stretcher is stopped adjacent to the aisle seat, for example seat C. The wheeled support device is configured so that the stretcher is at the same height as the height of the aircraft seating. The medical escort (or similar attendant) stands in front of the wheeled support device in the aisle with a cabin crew member standing behind the wheeled support device with a brake activated.

Step 2—The medical escort places the slide board across two of the aircraft seats which may typically be an aisle seat and adjacent middle seat. Whilst standing in the aisle, the medical escort partially slides the stretcher from the wheeled support device onto the aisle-facing portion of the slide board overlying seat C so that the stretcher is partially on seat C and partially still supported by the wheeled support device. The cabin crew member disengages the brake of the wheeled support device and as the medical escort continues to slide the stretcher onto seat C the cabin crew member slowly withdraws the wheeled support device. Simultaneously with withdrawal of the wheeled support device, the medical escort rotates the stretcher approximately 45° so that the stretchered person's back begins to turn toward Seat A. The stretcher seat is then fully slid onto seat C and the stretcher rotated a further 45° to a port-starboard orientation wherein the stretchered person's back faces toward the window and their feet extend into the aisle. The wheeled support device is fully withdrawn to the row behind.

Step 3—the medical escort moves into the seating row in front of the stretcher (or if escorting a large patient then into the seating row behind) and with one hand can deploy the support member and lock it into place at either 30° or 45° position. The support member stabilises the stretcher when on the aircraft seats. The support member can be operated with one hand via the one-handed hinge configuration which allows the escort's other hand to support the stretcher.

Step 4—the medical escort (if during a single person loading operation) pushes down on the backrest with one or two arms causing the stretcher to tilt backward about a fulcrum portion on the underside of the stretcher seat in a see-saw motion. In this procedure, the stretchered person's centre of gravity is shifted approximately above the fulcrum portion of the stretcher. The stretcher person's feet are raised above the aisle. In a two person loading operation, a cabin crew member, family member or second escort can hold the lower-leg rest of the stretcher for added support. The medical escort pulls the stretcher from seat C to seat B sliding the fulcrum portion across the slide board approximately 400-450 mm. If a larger person is occupying the stretcher and the footwell space is limited the stretcher can be pushed from the aisle while holding the lower leg rest of the stretcher moving from seat C to seat B. This procedure is facilitated by the low-friction quality of the slide board and the low-friction pads on the fulcrum portion.

Step 5—once the stretcher seat is located on seat B and such that the lower-leg rest clears the aisle and is seated on seat C, the backrest will recline above seat A and wherein the stretchered person occupies approximately all of seats A, B and C. The stretcher and stretchered person are then secured in this position using the seatbelts of seats A, B and C and, in some particular configurations, using one or two extension seat belts. In one exemplary seatbelt configuration, the seatbelt of seat A is fed through an opening in the support member and connected and tightened to secure the support member to seat A. The seatbelt of seat B is fed through an opening in a harness loop provided on a side or underside of the stretcher seat and is connected and tightened to secure the stretcher seat to seat B. The seatbelt of seat C is fed through an opening in the lower-leg rest and is connected and tightened to secure the lower-leg rest to seat C.

According to a form of the invention, the backrest hinge is configured with higher load-rating as compared to the support member hinge and lower-leg rest hinge in order to accommodate the increased loading applied to the backrest hinge during the pivoting or see-saw loading procedure. The support member hinge and lower-leg rest hinge may be configured as smaller hinges having lower load-rating so as to minimise stretcher weight.

BRIEF DESCRIPTION OF DRAWINGS

The present invention will now be described with reference to the figures of the accompanying drawings, which illustrate particular preferred embodiments of the present invention, wherein:

FIG. 4 is a sectional view of a backrest hinge of the aircraft stretcher;

FIGS. 5 and 6 respectively illustrate a locking handle of the backrest hinge in a locked position and an open position;

DETAILED DESCRIPTION

Figures 1, 2, 3:
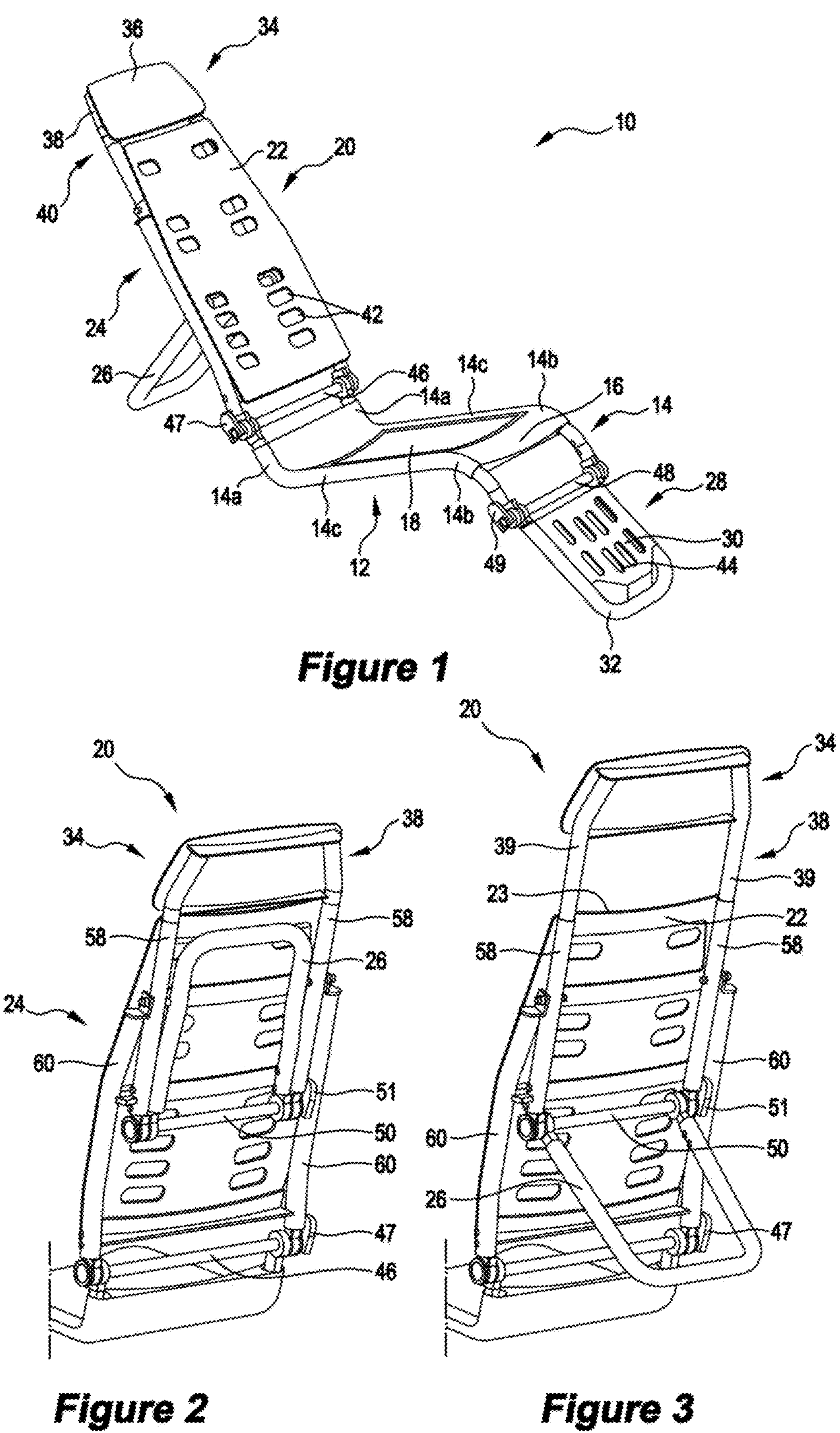
FIG. 1 is a perspective view of an aircraft stretcher according to the present invention.
FIGS. 2 and 3 respectively illustrate a foldable support member in a folded position and deployed position.

FIG. 1 illustrates an aircraft stretcher 10 according to an embodiment of the invention. Aircraft stretcher 10 includes a seat 12, a backrest 20, a lower-leg rest 28 and a head rest 34. The stretcher 10 in FIGS. 1-7 is shown without a harness for ease of illustration but will typically be provided with a harness for securing the person to the stretcher 10. The stretcher 10 is illustrated in subsequent Figures (for example FIG. 9) with a harness 90.

The seat 12 includes a seat frame 14 and a seat panel 16 secured to the seat frame 14. The seat panel 16 has a two-part configuration including top and bottom parts respectively connected to top and bottom sides of the seat frame 14. Each of the top and bottom parts include vacuum formed 3 mm HDPE panels. The seat panel 16 further includes an EVA foam section 18 of approximately 10 mm thickness provided for additional comfort.

In an alternative form of the invention, the seat does not include HDPE material and instead includes an aluminium concave panel.

The backrest includes a backrest frame 24 and a backrest panel 22 secured to the backrest frame 24. The backrest panel 22 has a slightly concaved configuration for improved comfort and engagement with a person's back. The backrest panel 22 is formed of an aluminium material such as aluminium alloy. The backrest panel has a thickness of approximately 1.6 mm. The backrest panel includes a plurality of weight-reducing openings 42, two of which are labelled in FIG. 1.

The headrest 34 includes a headrest frame 38 and a headrest panel 36 secured to the headrest frame 38. The headrest panel 36 is formed of an aluminium material such as aluminium alloy. The headrest panel 36 has a thickness of approximately 3 mm. The headrest frame 38 is connected to an upped end of the backrest frame 24 via a telescopic configuration 40 which enables positional adjustment of the headrest 34 relative to the backrest 20.

The lower-leg rest 28 includes a lower-leg rest frame 32 and a lower-leg rest panel 30 secured to the lower-leg rest frame 32. The lower-leg rest panel 30 is formed of an aluminium material such as aluminium alloy. The lower-leg rest panel 30 has a thickness of approximately 1.6 mm. The lower-leg rest panel 30 includes a plurality of weight-reducing openings 44.

The seat frame 14, backrest frame 24, headrest frame 38 and lower-leg rest frame 32 each one or more include aluminium tubes. The lower-leg rest frame 32 includes aluminium tubing in a U-shaped configuration. The seat frame 14 includes a pair of spaced apart aluminium tubes, each having an upwardly curved portion 14*a*, a downwardly curve portion 14*b* and a straight portion 14*c* extending between the upwardly and downwardly curved portions 14*a*, 14*b*. The backrest frame 24 will subsequently described in further detail below with respect to FIG. 2.

The stretcher 10 further includes a U-shaped support member 26 hingedly connected to the rear of the backrest 20. The support member 26 includes a tubular aluminium alloy of 3 mm wall thickness and 25 mm diameter the same as the backrest frame 24. The support member 26 may also be formed of aluminium alloy 6060 T5.

The backrest 20 is hingedly connected to the seat 12 via a backrest hinge 46. The lower-leg rest 28 is hingedly connected to the seat 28 via a lower-leg rest hinge 48. More particularly, the backrest frame 24 is hingedly connected to the upwardly curved portions 14*a* of the seat frame 14 and the lower-leg rest frame 32 is hingedly connected to the downwardly curved portions 14*b* of the seat frame 14. The support member 26 is hingedly connected to the backrest 20 via a support member hinge 50.

Each of the hinges 46, 48, 50 are configured for one-handed operation. Each of the hinges 46, 48, 50 include a locking handle movable between an option position in which rotation of the hinge is permitted and a locked position in which the hinges are locked against rotation. Each of the locking handles are located on the same side of the stretcher 10 which, in the illustrated examples, is the right-hand side of the stretcher. In particular, the backrest hinge 46 includes a locking handle 47, the lower-leg rest hinge 48 includes a lower-leg rest hinge locking handle 49 and the support member hinge 50 includes a support member hinge locking handle 51.

Turning to FIG. 2, the backrest frame 24 includes two pairs of spaced apart tubes and, in particular, a pair of spaced apart upper tubes 58 and a pair of spaced apart lower tubes 60. The pair of upper tubes 58 extend to an upper edge 23 of the backrest panel 22. The upper tubes 58 connects via the telescopic arrangement 40 to the headrest frame 38 which includes a pair of tubular headrest frame portions 39. As best shown in FIG. 3, the telescopic arrangement 40 involves the tubular headrest frame portions 39 being telescopically received in open upper ends of the pair of upper tubes 50 of the backrest frame 24. The pair of frame portions 39 are permitted to telescopically slide upwardly or downwardly with respect to the backrest 20 thereby enabling upward or downward positional adjustment of the headrest 34.

The positional adjustment of the headrest 34 is illustrated in FIGS. 2 and 3. FIG. 2 illustrates the headrest 34 in a retracted position where a lower edge of the headrest 34 is adjacent the upper edge 23 of the backrest panel 22. FIG. 3 illustrates the headrest 34 in an extended position where the telescopic arrangement 40 has enabled the headrest 34 to be extended above the backrest 20. It will be appreciated that positional adjustment of the headrest 34 allows the headrest to be positioned according to the particular head position of the stretchered person and allows varying body sizes to be accommodated.

The pair of lower tubes 60 connect via the backrest hinge 46 to the seat frame 14. Each of the upper and lower backrest frame tubes 58, 60 are aluminium tubes of approximately 25 mm diameter and 3 mm wall thickness and formed of aluminium alloy 6060 T5.

FIGS. 2 and 3 also illustrate movement of the support member 26 between a folded position shown in FIG. 2 and a deployed position shown in FIG. 3. In the folded position shown in FIG. 2, the support member 26 extends upwardly from the support member hinge 50 in a direction approximately parallel with the upper tubes 58 of the backrest frame 24. In the folded position, the support member 24 is located between the upper tubes 60 as shown in FIG. 2. In the deployed position shown in FIG. 3, the support member 26 extends rearwardly and downwardly from the support member hinge 50. The orientation of the support member 26 may be adjusted in order to correspond with adjustment of reclined orientation of the backrest 20. For example, if the backrest 20 is moved to a more upright orientation the support member hinge 50 is moved upwards so the support member 26 may be adjusted to a more downward orientation so as to make contact with the airline seat. If the backrest 20 is moved to a more reclined position the support member hinge 50 is brought closer to the airline seat and so the support member 26 may be moved to a more rearwardly extending orientation in order to accommodate the position of the backrest 20.

Turning to FIG. 4, there is provided a rear sectional view of the backrest hinge 46 which includes a left hinge portion 46*a* and a right hinge portion 46*b*. The left hinge portion 46*a* hingedly connects the left lower tube 60*a* of the backrest frame to the left upwardly curved portion 14*a*-1 of the seat frame. The right hinge portion 46*b* hingedly connects the right lower tube 60*b* of the backrest frame to the right upwardly curved portion 14*a*-2 of the seat frame. The backrest hinge 46 further includes a link bar 62 connecting the left and right hinge portions 46*a*, 46*b*. The backrest hinge locking handle 47 includes a gripping portion 49 and a cam portion 64.

The link bar 62 connects to the locking handle 47 between the cam portion 64 and the gripping portion 49 such that the locking handle 47 has a second-class lever configuration. The cam portion 64 is configured as a fulcrum to convert rotational of the handle 47 to linear movement of the link bar 62.

FIG. 5 illustrates the locking handle 47 in a locked configuration wherein the left and right hinge portions 46*a*, 46*b* are in a locked configuration. The left and right hinge portions 46*a*, 46*b* may each include a serrated hinge having a pair of opposing toothed faces which engage with one another to lock the hinge against relative movement. Movement of the locking handle 47 to the open or unlocked position shown in FIG. 6 causes the cam portion 64 to abut and lever against the right hinge portion 46*b* and the locking handle 47 consequently pulls the link bar in the direction of the locking handle 47. This urges the pairs of toothed faces out of engagement with one another thereby allowing movement of the hinge portions 46*a*, 46*b*. The lower-leg rest hinge 48 and support member hinge 50 may be configured in the same manner as the backrest hinge 46 described above.

According to an embodiment of the invention, the backrest hinge 46, lower-leg rest hinge 48 and support member hinge 50 all include Variloc™ hinges. In a form of the invention the backrest hinge includes a steel Variloc™ hinge and the lower-leg rest hinge 48 and support member hinge 50 include aluminium Variloc™ hinges. The backrest hinge 46 may be formed of steel due to higher load requirements as compared to the lower-leg rest hinge 48 or support member hinge 50 which can be formed of lighter weight aluminium material.

In applications whether the stretcher 10 of the present invention is used as a sleeping stretcher for passengers or crew, the stretcher may typically be kept in storage until level flight is achieved and the cabin seat belt sign has been switched of. Thereafter, the stretcher 10 may be retrieved from storage (eg. overhead bin storage in the cabin) and deployed onto three or four side-by-side aircraft seats. This procedure may involve the stretcher 10 being unfolded from the folded configuration shown in FIG. 19 to the unfolded configuration shown in FIG. 1 and placed across the three or four seats. The stretcher 10 may then be secured to the aircraft seats using the seat belts of the aircraft seats in accordance with one of the possible methods discussed further below. Once secured, the stretcher 10 is ready for a passenger to lie on the stretcher and optionally fit the stretcher harness, as may be required by airline or regulatory requirements.

A different method may apply when the stretcher 10 is used as a medical stretcher for transporting a person of limited mobility and these are exemplified in FIGS. 7 to 15.

Figure 7:
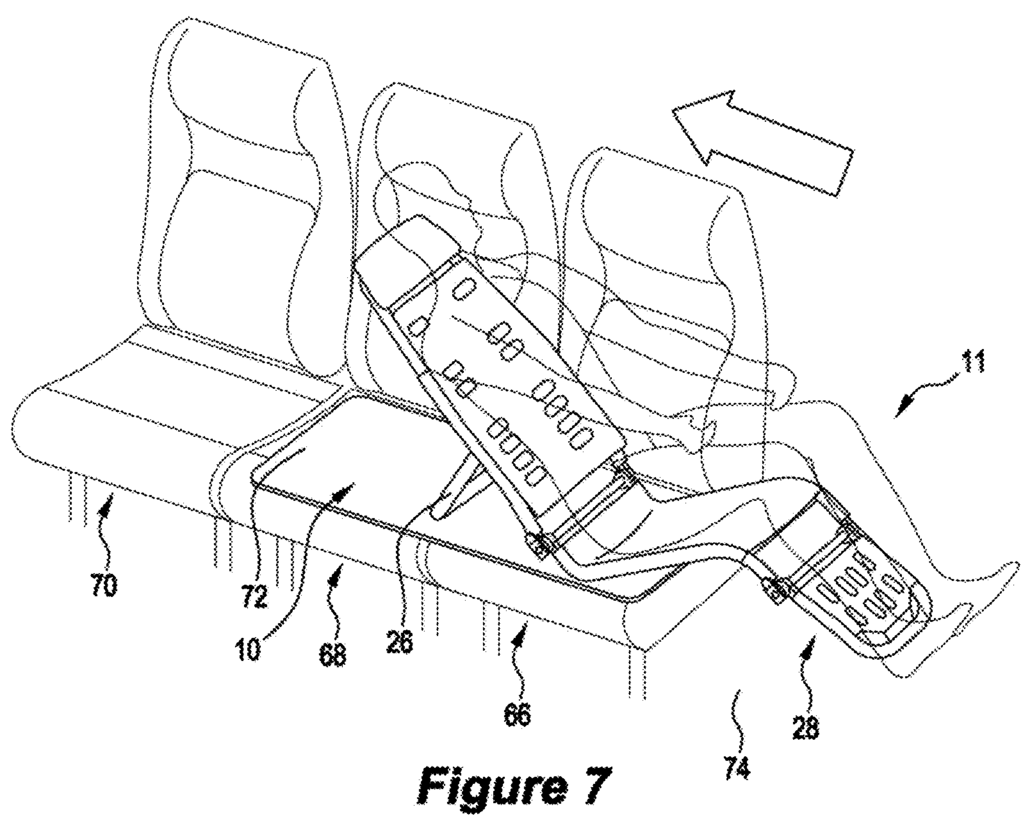
FIGS. 7 and 8 illustrates the aircraft stretcher being loaded on side-by-side aircraft seats.
Figure 8:
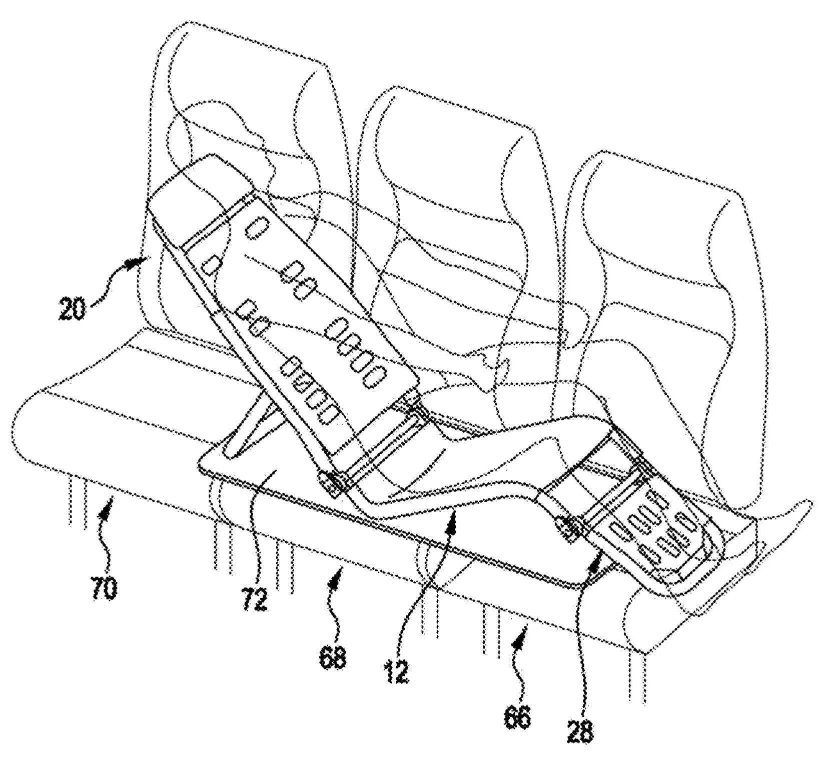

Turning to FIGS. 7 and 8, there is illustrated an example method of loading the aircraft stretcher 10 carrying a stretchered person 11 onto three side-by-side aircraft seats including an aisle seat 66, a middle seat 68 and a window seat 70. A low-friction slide board 72 including a 900×400 mm HDPE plate is first located atop the aisle and middle seats 66, 68. In FIG. 7, the stretcher 10 (with the stretchered person 11) already thereon has been shifted from the aircraft aisle 74 to the aisle seat 66 atop the slide board 72 and simultaneously rotated 90° such that the stretcher 10 and stretchered person 11 are in a port-starboard orientation (i.e. perpendicular to the direction of aircraft travel and sitting) and with the lower-leg rest 28 protruding into the aircraft aisle 74. The support member 26 is in the deployed position and in contact with the slide board 72 so as to support the stretcher 10 against tipping backwards.

The slide board 72 is configured with a low-friction surface so as to facilitate sliding of the stretcher 10 (by a medical escort or similar) across the slide board 72 from the initial position shown in FIG. 7 to the final position shown in FIG. 8 and in which the seat 12 is over the middle seat 68, the lower-leg rest 28 is over the aisle seat 66 and the backrest 20 is over the window seat 70.

A modified method of loading the stretcher 10 and stretchered person 11 is illustrated in FIGS. 9 to 14. According to this method, the stretcher 10 is positioned on the slide board 72 in the same manner as FIG. 7 but with the support member 26 left in the folded position. The underside of upwardly curved portions 14*a* define fulcrum portions about which the stretcher 10 can be tilted backwards such that only the fulcrum portions are in contact with the slide board 72. The fulcrum portions may also include low-friction slide pads to further facilitate sliding of the stretcher 10 across the slide board 72. With the stretcher 10 tipped backwards into a see-saw position, the stretcher 10 may then be pulled backward along the slide board 72 until the loaded position shown in FIG. 8.

Once in the final position illustrated in FIG. 8, the stretcher 10 and stretcher person 11 are secured to the aircraft seat using the aircraft seat belts according to one of the configurations discussed below with reference to FIGS. 16 and 17.

Turning to FIGS. 9 to 14 there is illustrated an alternative method of loading the stretcher 10 onto the three side-by-side seats 66, 68, 70 whilst a person is supported on the stretcher. The stretchered person is not shown in FIGS. 9 to 14 for clarity and convenience of illustration. However, it will be appreciated that this method is, in use, performed with a person of limited mobility positioned on the stretcher 10.

Figure 9:
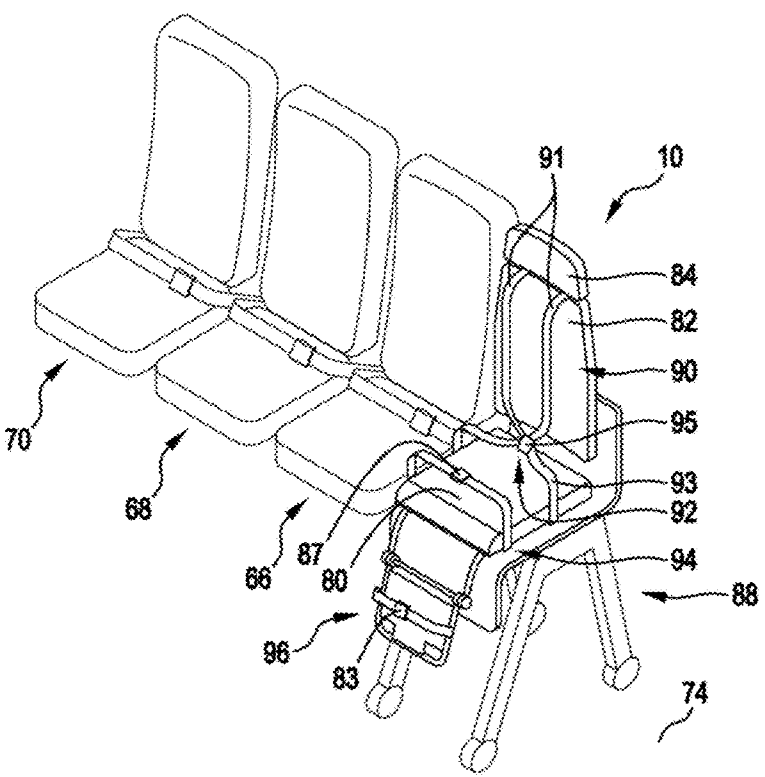
FIGS. 9 to 14 illustrate an alternative method of the aircraft stretcher being loaded on side-by-side aircraft seats.

FIG. 9 illustrates the stretcher 10 atop a wheeled support device 88 configured to transport the stretcher 10 and a stretchered person (not shown) along an aircraft aisle 74 to a designated row of three side-by-side seats which include an aisle seat 66, a middle seat 68 and a window seat 70. The stretcher 10 of FIG. 9 is illustrated with a headrest cushion 84, a backrest cushion 82 and a seat cushion 80. The stretcher 10 in FIG. 9 is further shown with a harness 90 for securing a person to the stretcher. The harness 90 includes a torso portion including a shoulder portion and a waist portion. The shoulder portion includes a pair of shoulder straps 91. The waist portion includes a pair of waist straps 93. The shoulder straps 91 and waist straps 93 are connected at a waist buckle 95. The harness 90 further includes a thigh portion and a lower-leg portion. The thigh portion includes a pair of thigh straps 94 connected at a thigh buckle 87. The lower-leg portion includes lower-leg straps 96 connected at a lower-leg buckle 83.

The thigh straps 94 and lower-leg straps 96 are located so as to secure the lower leg or knee against flailing in an uncontrolled manner during high deceleration such as during a heavy landing. In an alternative form of the invention (not illustrated) the harness may include additional straps. For example, the harness may include lower thigh straps and upper thigh straps. In a particular form of the invention, the harness includes knee straps for securing around the knee of the stretchered person.

Figure 10:
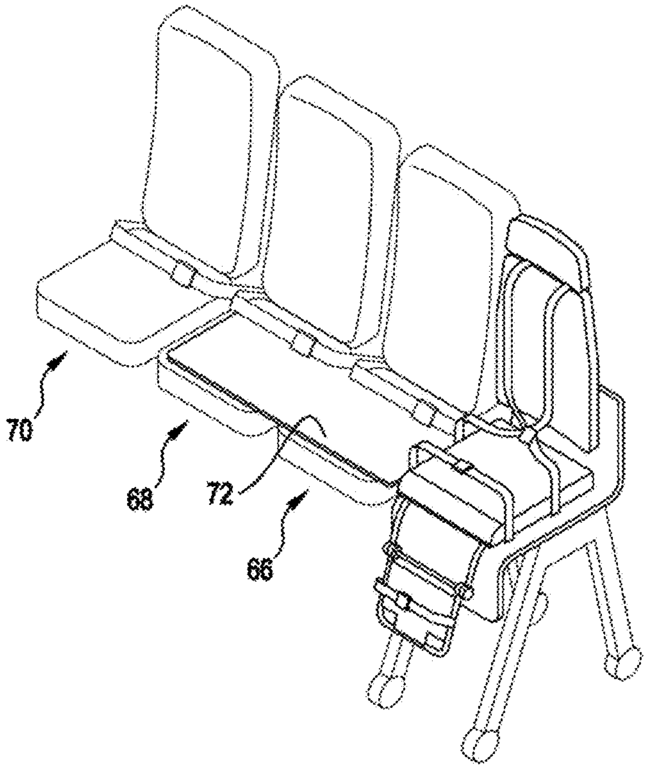

Turning to FIG. 10, once stretcher 10 with the person supported thereon has been wheeled to the designated row as shown in FIG. 9, the slide board 72 is located across the seats. Depending on the slide board 72 length, the slide board 72 may overly the aisle seat 66 and the middle seat 68 or may in some instances overlie part of all of the window seat 70 also.

Figure 11:
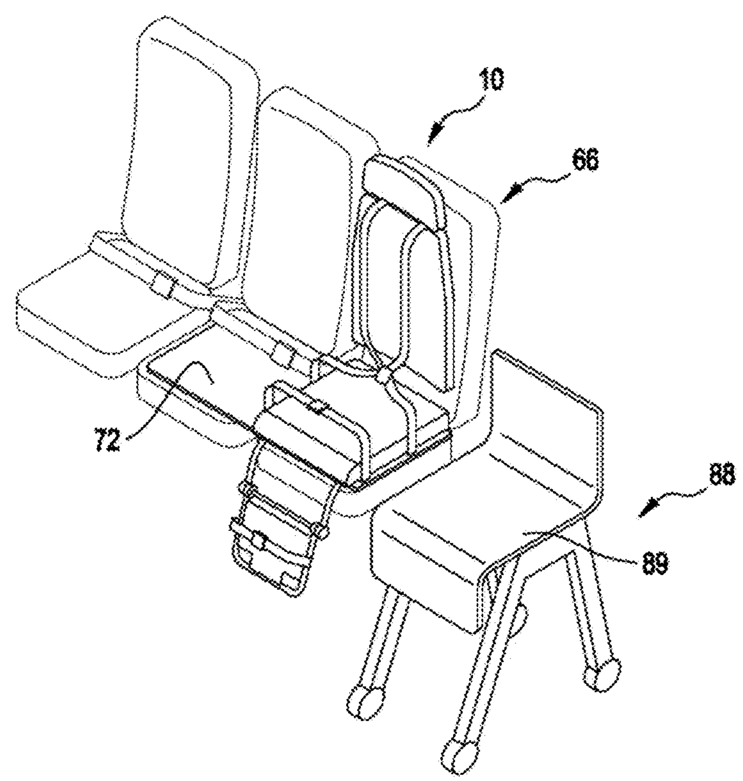

As shown in FIG. 11, the next step in the loading procedure is for the stretcher 10 be transferred sideways (for example, slid) from the support device 88 to the aisle seat 66 and so as to overlie the slide board 72. The wheeled support device 88 is configured with a support platform 89 which is level with the height of the aisle seat 66 so as to facilitate this transferring step. This step of transferring the stretcher 10 from the wheeled support device 88 to the aisle seat 66 may occur without any rotation of the stretcher 10 such that the stretcher 10 remains forward-facing after the transfer. In some alternative instances, the stretcher 10 may be simultaneously rotated 90° so that the stretcher is transferred onto the aisle seat 66 in the orientation shown in FIG. 7.

Figure 12:
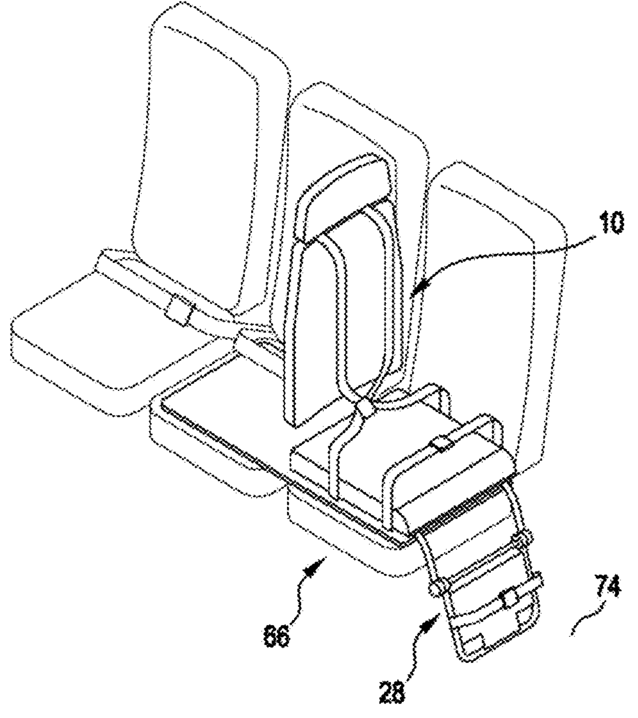

Turning to FIG. 12, the next step of the loading procedure (assuming rotation of the stretcher 10 was not performed simultaneous with transfer onto the aisle seat 66) is to then rotate the stretcher, with the person still supported thereon, approximately 90° such that the person's feet and the lower-leg rest 28 are located in the aisle 74. Until this point in the loading process the stretcher and stretchered person are still maintained relatively upright.

Figure 13:
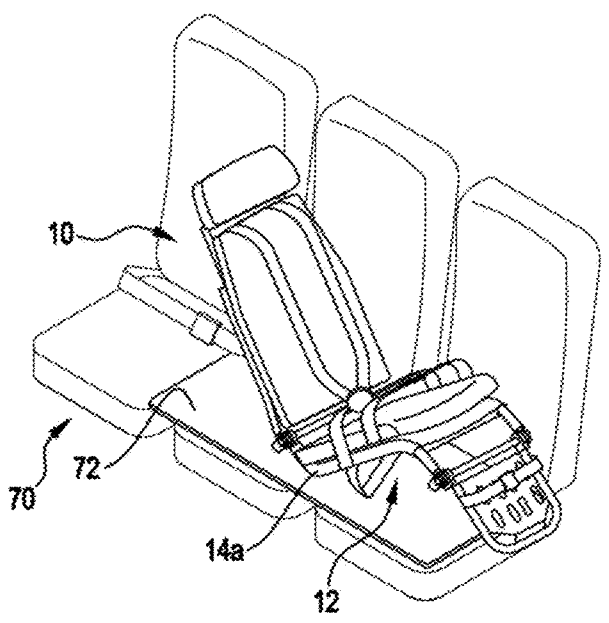

Turning to FIG. 13, the stretcher 10 is then tilted backward toward window seat 70 so as to balance on a fulcrum portion of the stretcher 10 provided by the seat frame upwardly curved portions 14*a*. In this position the only contact points between the stretcher 10, with the stretchered person thereon, and the slide board 72 are the seat frame upwardly curved portions 14*a*. Frictional resistance is therefore reduced and sliding of the stretcher 10 across the slide board 72 is facilitated.

Figure 14:
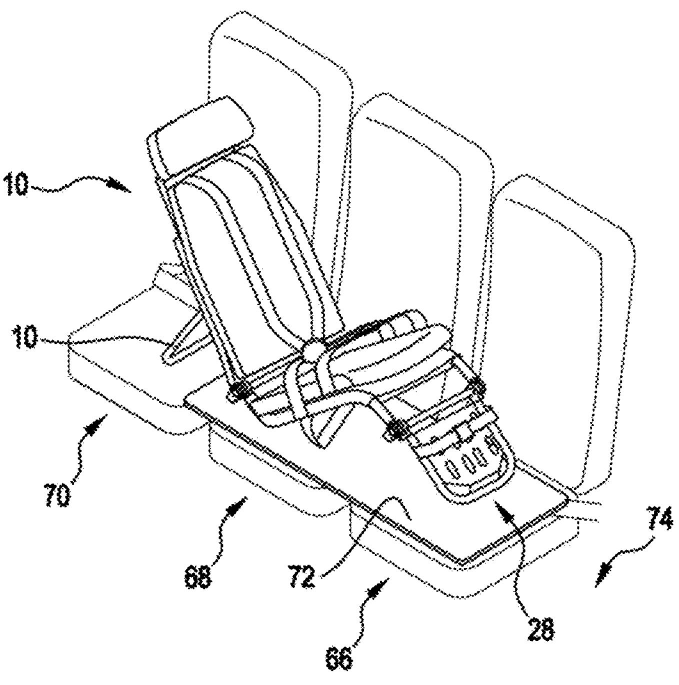

Turning to FIG. 14, the stretcher 10 has been slid across the slide board 72 in the direction of window seat 70 until the lower-leg rest 28 is clear of the aisle 74 and the stretcher 10 is located across all three side-by-side seats 66, 68, 70. The support member 26 which has previously remained in its folded position is moved to its deployed position via operation of support member locking handle 51 which is best shown in FIGS. 2 and 3.

Once in position across seats 66, 68, 70, the stretcher is secured to the aircraft seats 66, 68, 70 via their respective seatbelts and which will be discussed with reference to FIGS. 15-17.

Figure 15:
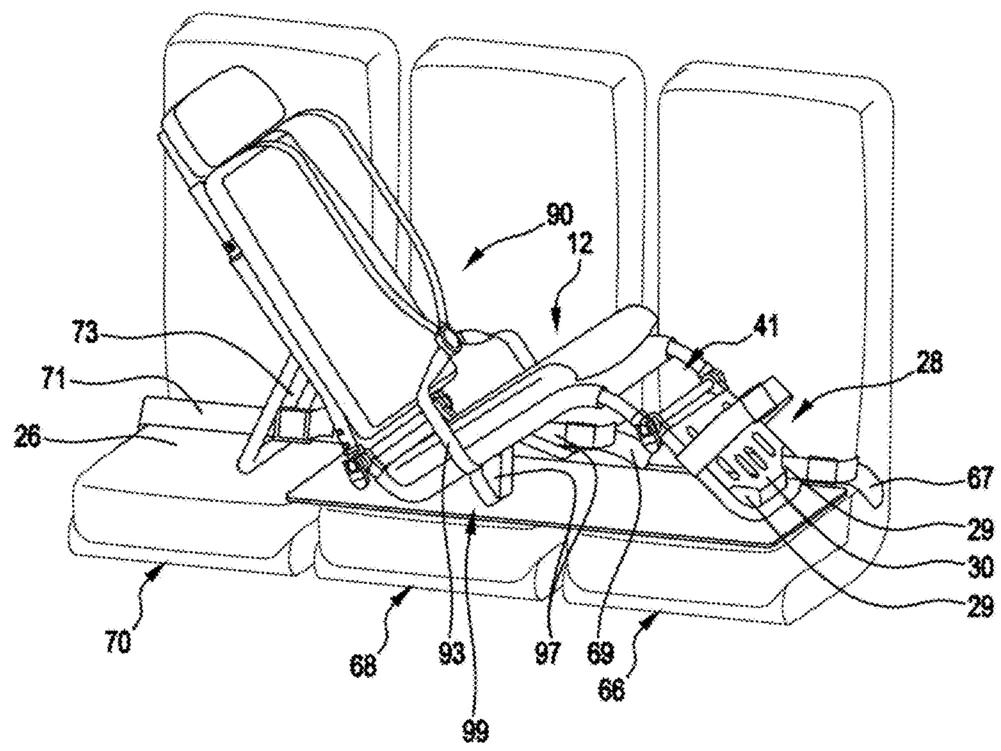
FIG. 15 illustrates one embodiment of a seatbelt configuration for securing the stretcher to the aircraft seats.
Figure 16:
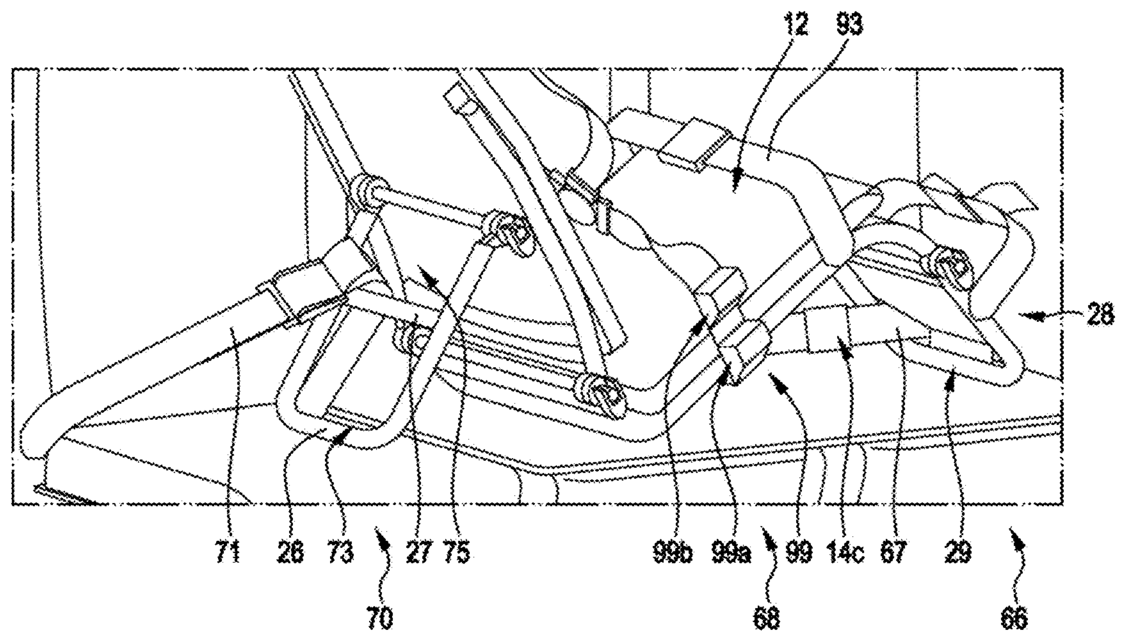
FIG. 16 is a perspective of an alternative seatbelt path configuration.

FIGS. 15 and 16 illustrate the same seatbelt configuration from different angles. The lower-leg rest frame 32 includes a pair of openings 29 between the frame 32 and lower-leg rest panel 30. The aisle seat seatbelt 67 is fed through the rear of the two openings 29 (i.e. the opening closest to the seatbelt 67) and seatbelt 67 is connected and tightened so as to secure the lower-leg rest to the aisle seat 66. Similarly, the window seat seatbelt 71 is fed through an opening 73 provided by the support member 26 and is connected and tightened so as to secure the support member 26 to the window seat 70.

The underside of the stretcher seat 12 is provided with a pair of flexible loops 99 each having an opening 97. The flexible loops 99 are provided by a soft webbing material. The flexible loops 99 are connected to harness waist straps 93. One of the flexible loops 99 is positioned at the left underside of the stretcher seat 12 and the other of the flexible loops 99 is positioned at the right underside of the stretcher seat 12. In the configuration illustrated in FIG. 15, the left side of the stretcher is adjacent the backrests of the aircraft seats 66, 68, 70 and therefore it is the left flexible loop 99 which is connected to the aircraft seatbelt. In particular, the middle seat seatbelt 69 is fed through the opening 97 in the left of the flexible loops 99. The middle seat seatbelt 69 is connected and tightened so as to secure the loop 99 to the middle seat 68. In this manner, the flexible loop 99 provides a connection between the harness 90 and the middle seat 69. The flexible loops 99 thereby provide one of the stretcher connection points for securing the stretcher 10 to the middle seat 68.

It will be appreciated that the right of the flexible loops 99 would be used where the stretcher 10 was orientated in the other direction (e.g. if located on the port side of the aircraft such that the right side of stretcher 10 faced toward the rear of the cabin).

FIG. 16 illustrates an alternative variation on the seatbelt configuration of FIG. 15. The connection between the lower-leg rest 28 and the aisle seat seatbelt 67 is the same in FIG. 16 as described with respect to FIG. 15. That is, the aisle seat seatbelt 67 is fed through one of the openings 29 in the lower-leg rest 28. However, FIG. 16 differs from FIG. 15 with respect to the window seat seatbelt 71 and the middle seat seatbelt 69.

In particular, with reference to FIG. 16, the support member 26 is provided with a cross-bar 27 which forms a lower opening 73 and an upper opening 75. The window seat seatbelt 71 is fed through the upper opening 75 and connected and tightened so as to secure the support member to the window seat 70. The provision of the cross-bar 27 and the upper opening 75 may in some instances increase the purchase or leverage on the support bar 26 which is achievable by the seatbelt 26. This configuration may also apply more of a downward load to the support bar 26 as compared to the configuration shown in FIG. 15.

The other variation in FIG. 16 as compared to FIG. 15 is that the stretcher 10 includes a pair of flexible loops 99 located at the opposite left and right side edges of the seat 12. The loops 99 are connected to the harness waist straps 93. The loops 99 include a lower loop 99*a* and an upper loop 99*b*. Only the right pair of loops 99 are visible in FIG. 16 however, the loop configuration is identical on the opposite left side of the stretcher 10. The middle seat seatbelt 69 is fed through a lower loop on the left side of the stretcher 10. The middle seat seatbelt 69 is then connected and tightened and which thereby secure the harness 90 to the middle seat 68. In this manner, the flexible loops 99 provide connection points configured to connect the aircraft seat seatbelt to the harness 90. This form of connection may be termed a 'direct connection' in so far as the aircraft seatbelt 69 is connected directly (i.e. with no intermediate component) to the harness loops 99. The connection may also occur indirectly and, for example, via an aircraft extension seatbelt which could be used to connect the harness loops 99 to the aircraft seatbelts.

Figure 17:
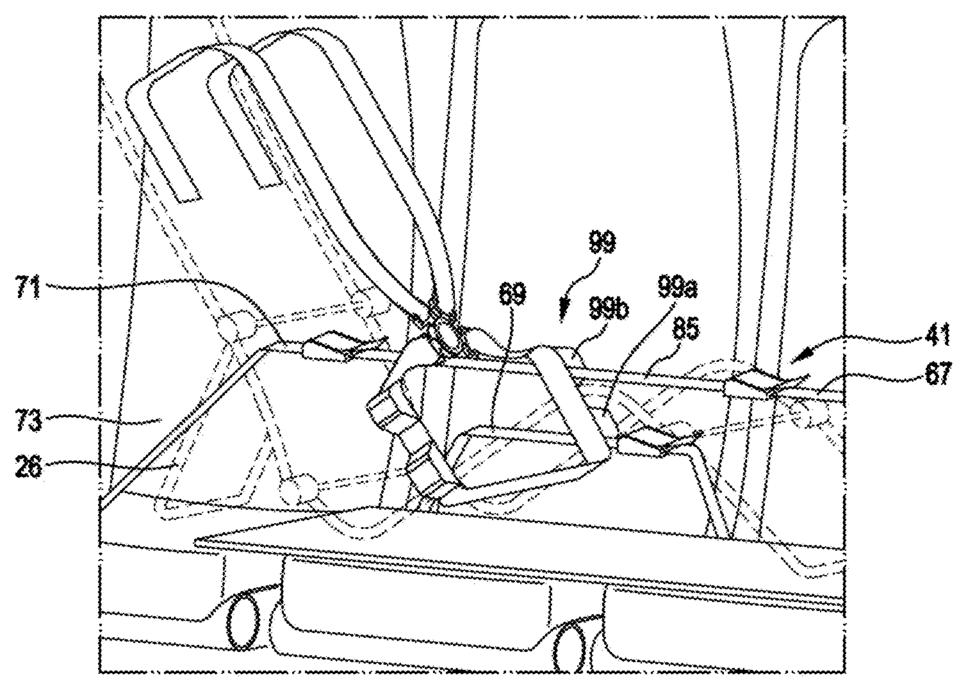
FIG. 17 is a perspective of a further alternative seatbelt configuration of FIG. 16 with the stretcher partially transparent for convenience of illustration.

This arrangement is more clearly shown in FIG. 17 and in which the middle seat seatbelt 69 is shown extending through the lower loop 99*a* in the left pair of loops 99.

FIG. 17 is equivalent to FIG. 16 with respect to the path of the middle seat seatbelt 69 but differs in the seatbelt paths of the window seat seatbelt 71 and the aisle seat seatbelt 67. As shown in FIG. 17, the window seat seatbelt 71 is connected to the aisle seat seatbelt 67 via an extension seatbelt 85 which extends through the upper loop 99*b* of the left pair of flexible loops 99. The window seat seatbelt 71 extends through the opening 73 in the support member 26. The aisle seat seatbelt 67 extends through an opening 41 between the seat 12 and the lower-leg rest 28 and which is more clearly shown in FIG. 15, although opening 41 is not utilised in the configuration shown in FIG. 15.

The use of extension seatbelt 85 in the embodiment illustrated by FIG. 17 provides an indirect connection between upper loop 99*b* and the window and aisle seat seatbelts 71 and 67 insofar as the upper loop 99*b* is connected to seatbelts 71, 67 via the extension seatbelt 85 as an intermediate component. This indirect connection is in addition to the direct connection between lower loop 99*a* and the middle seat seatbelt 69.

In all of the embodiments shown in FIGS. 15 to 17, the flexible loops 99 are formed of the same material as the harness straps (for example, a seatbelt material such as woven polyester) and are connected with the harness waist straps 93. The connection between the harness waist straps 93 and the flexible loops may be via stitching or any other method providing a sufficiently strong connection suitable to support load transfer between the harness and the aircraft seatbelt.

It will be appreciated from the various configurations exemplified in FIGS. 15-17 that various seat belt paths and belt configurations may be suitable for use with the stretcher of the present invention. It will also be appreciated that the stretcher 10 may be configured for use with different seatbelt configurations which may be selected depending on the particular application and/or on the type of seatbelts provided on the aircraft and/or the availability of extension seatbelts and/or on the size or weight of the person on the stretcher and/or on particular regulations or requirements of the airline or relevant aviation authority.

Figure 18:
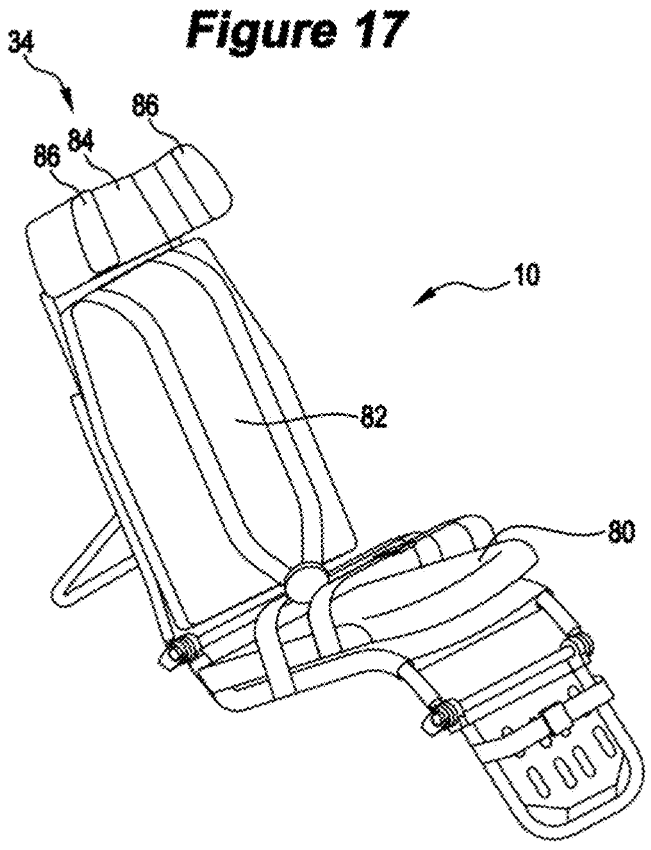
FIG. 18 illustrates the aircraft stretcher having a pair of lateral head rests.

With reference to FIG. 18, the aircraft stretcher 10 may be provided with cushions for improved comfort. In particular, the seat cushion 80, backrest cushion 82 and the headrest cushion 84 may improve comfort for both the sleeping-stretcher application and the medical transport application. The headrest 34 may include a pair of lateral support wings 86 for laterally supporting the stretchered person's head. In the illustrated embodiment of FIG. 18, lateral support wings are of a fixed configuration. In alternative embodiments, the lateral support wings may have a folding configuration to facilitate storage and portability of the stretcher 10.

In the case that the stretcher 10 is being used as an aircraft bed, the lateral support wings 86 may improve sleeping conditions by providing passenger head support. In the case that the stretcher 10 is being used in a medical application such as to transport a person with limited mobility, the lateral support wings 86 may be particular advantageous during take-off, landing (particularly a heavy landing) where lateral forces due to acceleration and deceleration are applied to the stretchered person.

Figure 19:
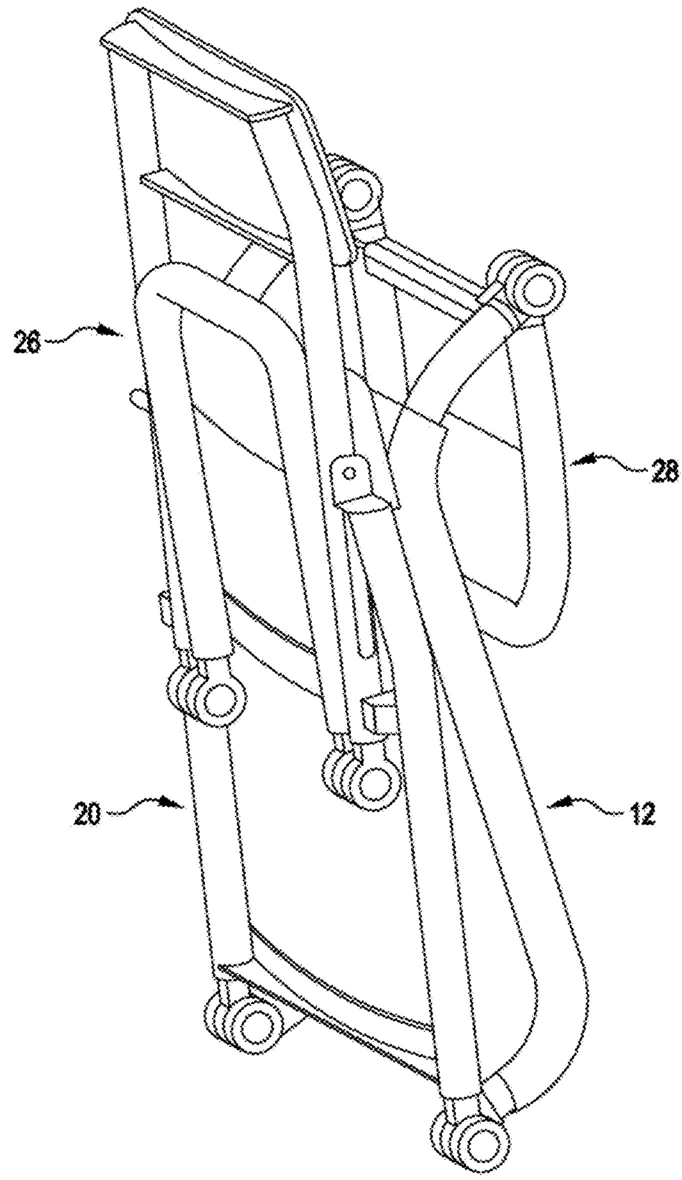
FIG. 19 illustrates the aircraft stretcher in a folded configuration for storage.

With reference to FIG. 19, the stretcher 10 is collapsible to a folded configuration for storage. In the folded configuration shown in FIG. 19, the backrest 20 is folded against the topside of seat 12 and the lower-leg rest 28 is folded against the underside of the seat 12. The stretcher 10 may be configured so as to fit in overhead storage bin of an aircraft when in the folded configuration. The stretcher 10 may be conveniently collapsed to the folded configuration shown in FIG. 19 via operation of the backrest hinge, lower-leg rest hinge and support member hinge.

Those skilled in the art will appreciate that the invention described herein is susceptible to variations and modifications other than those specifically described. It is understood that the invention includes all such variations and modifications which fall within the spirit and scope of the present invention.

Where any or all of the terms "include", "includes", "included" or "including" are used in this specification (including the claims) they are to be interpreted as specifying the presence of the stated features, integers, steps or components, but not precluding the presence of one or more other features, integers, steps or components.

The invention claimed is:

1. A portable aircraft stretcher for supporting a person on an aircraft across three or four side-by-side commercial aircraft seats of the aircraft, the portable aircraft stretcher including:
- a seat and a backrest, the backrest having a reclined orientation for supporting the person in a reclined position across and above the three or four side-by-side commercial aircraft seats;
- a support member extending downwardly from the backrest for supporting the backrest;
- a harness for securing the person to the portable aircraft stretcher; and
- one or more connection points configured to engage with at least one aircraft seatbelt of the three or four side-by-side commercial aircraft seats for securing the portable aircraft stretcher in a port-starboard orientation to at least one of the three or four side-by-side commercial aircraft seats during take-off of the aircraft and landing of the aircraft.

2. The portable aircraft stretcher according to claim 1, wherein at least one of the one or more connection points is configured to connect the harness with at least one of the three or four side-by-side commercial aircraft seatbelts.

3. The portable aircraft stretcher according to claim 1, including a backrest hinge connecting the backrest to the seat and allowing selective adjustment of the backrest reclined orientation.

4. The portable aircraft stretcher according to claim 1, further including a lower-leg rest connected to the seat by a lower-leg rest hinge allowing selective adjustment of the lower-leg rest position relative to the seat.

5. The portable aircraft stretcher according to claim 4, the one or more connection points including an opening in the lower-leg rest and wherein one of the seat belts is insertable through the opening in the lower-leg rest.

6. The portable aircraft stretcher according to claim 5, wherein:
- the opening is a lower opening;
- the support member further comprises an upper opening;
- the portable aircraft stretcher further comprises at least one flexible loop defining a third opening;
- the lower-leg rest comprises at least a fourth opening; and
- portable aircraft stretcher is configured for connection to the three or four side-by-side commercial aircraft seats by a first seatbelt extending through the third opening, a second seatbelt extending through the fourth opening, and a third seatbelt extending through at least one of the lower opening and the upper opening.

7. The portable aircraft stretcher according to claim 1, including a support member hinge connecting the support member to a rear of the backrest and allowing selective positioning of the support member between a folded position and a deployed position.

8. The portable aircraft stretcher according to claim 1, the one or more connection points including an opening in the support member and wherein one of the aircraft seatbelts is insertable through the support member opening.

9. The portable aircraft stretcher according to claim 1, including a first connection point configured for attachment to a seatbelt of a first aircraft seat of the three or four side-by-side commercial aircraft seats, a second connection point configured for attachment to a seatbelt of a second aircraft seat of the three or four side-by-side commercial aircraft seats adjacent the first aircraft seat and a third connection point configured for attachment to a seatbelt of a third aircraft seat of the three or four side-by-side commercial aircraft seats adjacent to the second aircraft seat.

10. The portable aircraft stretcher according to claim 1, the stretcher being collapsible to a stowed configuration allowing for overhead storage in a commercial aircraft.

11. The portable aircraft stretcher according to claim 1, the stretcher further including a headrest including a pair of lateral supports for supporting opposite sides of a head of the person.

12. The portable aircraft stretcher according to claim 1, the portable aircraft stretcher including a frame, the backrest including a back panel secured to the frame and the seat including a seat panel secured to the frame.

13. The portable aircraft stretcher according to claim 1, wherein the portable aircraft stretcher is configured for transporting a person of limited mobility.

14. The portable aircraft stretcher according to claim 13, the portable aircraft stretcher being configured for continuously supporting the person of limited mobility in flight and also during loading and unloading of the person from the aircraft.

15. The portable aircraft stretcher according to claim 14 including a fulcrum portion allowing the stretcher to be pivoted about the fulcrum portion for facilitating loading and unloading of the portable aircraft stretcher.

16. The portable aircraft stretcher according to claim 15, the fulcrum portion including a curved portion on an underside of the seat.

17. A stretcher apparatus including the portable aircraft stretcher according to claim 1 and a slide board for location between the three or four side-by-side commercial aircraft seats and the portable aircraft stretcher, the slide board configured to facilitate loading and unloading of the portable aircraft stretcher and to support the portable aircraft stretcher during flight.

18. The stretcher apparatus according to claim 17, the portable aircraft stretcher including one or more slide pads configured to slide on the slide board during loading and unloading of the portable aircraft stretcher.

19. The portable aircraft stretcher according to claim 1, wherein the portable aircraft stretcher has a total length of 1500 millimeters or fewer.

20. The portable aircraft stretcher according to claim 1, wherein the at least one aircraft seatbelt of the three or four side-by-side commercial aircraft seats is provided for securing a seated passenger in a commercial aircraft seat of one of the three or four side-by-side commercial aircraft seats during take-off and landing.

21. A method of loading a person having limited mobility onboard a commercial aircraft using the stretcher apparatus according to, the method including the steps of:

loading the person of limited mobility onto the portable aircraft stretcher;

transporting the portable aircraft stretcher, with the person supported thereon, onboard the commercial aircraft and along an aircraft aisle to a designated row of three or four side-by-side commercial aircraft seats which include an aisle-adjacent seat;

locating the slide board across two of the three or four side-by-side commercial aircraft seats;

transferring the portable aircraft stretcher, with the person supported thereon, from the aircraft aisle to the aisle-adjacent seat, the step of transferring including rotating the portable aircraft stretcher 90° into a port-starboard orientation whilst simultaneously shifting the portable aircraft stretcher onto a portion of the slide board overlying the aisle-adjacent seat;

sliding the portable aircraft stretcher, with the person supported thereon, along the slide board in a direction away from the commercial aircraft aisle to a position where the person and the portable aircraft stretcher are clear of the aisle; and securing the portable aircraft stretcher to the three or four side-by-side commercial aircraft seats using the aircraft seat belts.

22. The method according to claim 21, wherein the portable aircraft stretcher, with the person supported thereon, is transported onboard the commercial aircraft and along the aisle using a wheeled support device that is releasably connected to the portable aircraft stretcher.

23. The method according to claim 21, wherein the step of sliding the portable aircraft stretcher across the slide board includes the steps of:

pivoting the portable aircraft stretcher about a fulcrum portion of the portable aircraft stretcher such from a normal position to a tipped position wherein only the fulcrum portion is in contact with the slide board;

sliding the fulcrum portion along the slide board from a first position on the slide board to a second position on the slide board with the portable aircraft stretcher in the tipped position; and returning the portable aircraft stretcher from the tipped position to the normal position.

* * * * *